US012504920B2

(12) United States Patent
Ayyapureddi et al.

(10) Patent No.: US 12,504,920 B2
(45) Date of Patent: Dec. 23, 2025

(54) METADATA COMMUNICATION BY A MEMORY DEVICE

(71) Applicant: Micron Technology, Inc., Boise, ID (US)

(72) Inventors: Sujeet V. Ayyapureddi, Boise, ID (US); Matthew A. Prather, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/625,008

(22) Filed: Apr. 2, 2024

(65) Prior Publication Data

US 2024/0354028 A1  Oct. 24, 2024

Related U.S. Application Data

(60) Provisional application No. 63/460,256, filed on Apr. 18, 2023.

(51) Int. Cl.
*G06F 3/06* (2006.01)
(52) U.S. Cl.
CPC .......... *G06F 3/0656* (2013.01); *G06F 3/0604* (2013.01); *G06F 3/0619* (2013.01); *G06F 3/0673* (2013.01)

(58) Field of Classification Search
CPC ..... G06F 3/0656; G06F 3/0619; G06F 3/0673
See application file for complete search history.

(56) References Cited

U.S. PATENT DOCUMENTS

| 2018/0069658 A1* | 3/2018 | Benisty | H03M 13/15 |
| 2020/0151106 A1* | 5/2020 | Ahn | G06F 3/0658 |
| 2024/0126438 A1* | 4/2024 | Suh | G06F 11/1048 |

* cited by examiner

*Primary Examiner* — Mark A Giardino, Jr.
(74) *Attorney, Agent, or Firm* — Holland & Hart LLP

(57) ABSTRACT

Methods, systems, and devices for metadata communication by a memory device are described. The memory device may receive first data from a first memory die of the memory device and second data from a second memory die of the memory device. The memory device may receive first metadata for the first data from the first memory die and second metadata for the second data from the second memory die. The memory device may combine the first metadata from the first memory die and the second metadata from the second memory die into a set of metadata. And the memory device may transmit the set of metadata to a host device via a pin, such as a metadata pin, allocated for a set of memory dies that includes at least the first memory die and the second memory die.

18 Claims, 6 Drawing Sheets

METADATA COMMUNICATION BY A MEMORY DEVICE

CROSS REFERENCE

The present Application for Patent claims the benefit of U.S. Provisional Patent Application No. 63/460,256 by AYYAPUREDDI et al., entitled "METADATA COMMUNICATION BY A MEMORY DEVICE," filed Apr. 18, 2023, assigned to the assignee hereof, and expressly incorporated by reference herein.

TECHNICAL FIELD

The following relates to one or more systems for memory, including metadata communication by a memory device.

BACKGROUND

Memory devices are widely used to store information in devices such as computers, user devices, wireless communication devices, cameras, digital displays, and others. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, the memory device may read (e.g., sense, detect, retrieve, determine) states from the memory cells. To store information, the memory device may write (e.g., program, set, assign) states to the memory cells.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states when disconnected from an external power source.

DETAILED DESCRIPTION

Figure 1:
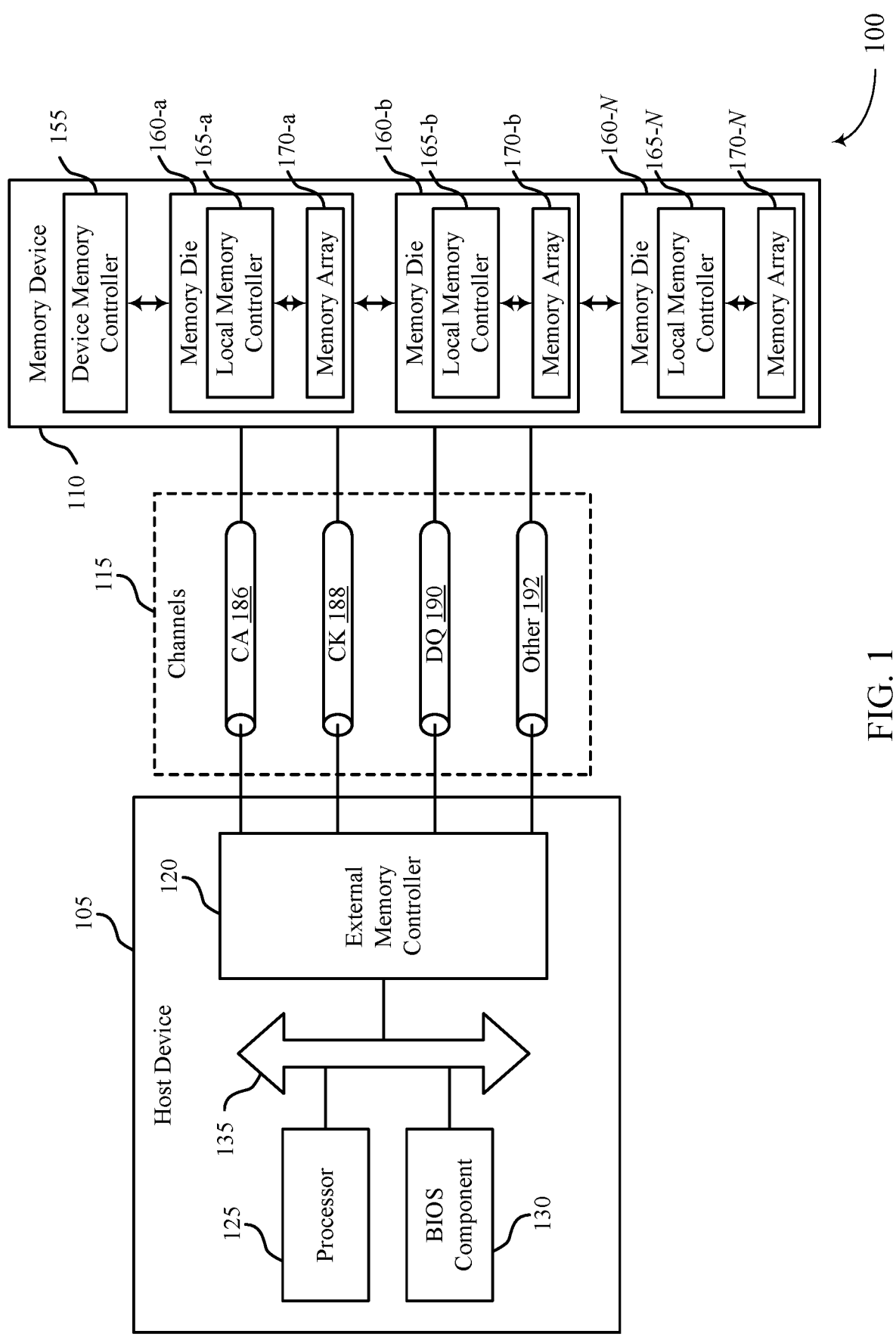
FIG. 1 illustrates an example of a system that supports metadata communication by a memory device in accordance with examples as disclosed herein.

A memory device may include a memory module that has multiple memory dies (e.g., DRAM dies) for servicing requests from a host device. In addition to storing data associated with the host device, the memory device may also store metadata that provides information about the data. To communicate the metadata to the host device, each memory die in the memory module may be coupled with a respective metadata pin that is used to communicate the metadata for that memory die. But having a respective metadata pin for each memory die may undesirably increase the size of the interface (e.g., an edge connector) between the memory device and the host device, among other disadvantages. Alternatively, the memory device may communicate the metadata to the host device by appending the metadata from a memory die to the end of a data stream from the memory die, and transmitting both types of information over data pins that are dedicated to that memory die. But transmitting metadata along with the data in the data stream over memory die-specific data pins may undesirably decrease the transmission bandwidth of the memory device, among other disadvantages.

According to the present disclosure, a memory device may communicate metadata from multiple memory dies over one or more pins (e.g., metadata pins) that are shared between the memory dies. To do so, the memory device may accumulate metadata from the memory dies (e.g., at a buffer of a logic component) before transmitting the metadata over the shared pins (e.g., shared metadata pins). In some examples, the memory device may also transmit cyclic redundancy check (CRC) bits over the pins (e.g., metadata pins) to increase the reliability of the transmission. Communicating metadata from multiple memory dies over one or more metadata pins that are shared between the memory dies will allow for the preservation of the interface size and transmission bandwidth of the memory device, among other advantages, relative to other techniques.

In addition to applicability in memory systems as described herein, techniques for metadata communication by a memory device may be generally implemented to improve the performance of various electronic devices and systems (including artificial intelligence (AI) applications, augmented reality (AR) applications, virtual reality (VR) applications, and gaming). Some electronic device applications, including high-performance applications such as AI, AR, VR, and gaming, may be associated with relatively high processing requirements to satisfy user expectations. As such, increasing processing capabilities of the electronic devices by decreasing response times, improving power consumption, reducing complexity, increasing data throughput or access speeds, decreasing communication times, or increasing memory capacity or density, among other performance indicators, may improve user experience or appeal. Implementing the techniques described herein may improve the performance of electronic devices by facilitating improved metadata communication by a memory device, which may allow for preservation of the interface size and transmission bandwidth of the memory device, decrease processing or latency times, improve response times, or otherwise improve user experience, among other benefits.

Features of the disclosure are initially described in the context of systems and dies as described with reference to FIGS. 1 and 2. Features of the disclosure are described in the context of a memory device and a process flow as described with reference to FIGS. 3 through 4. These and other features of the disclosure are further illustrated by and described with reference to an apparatus diagram and flowcharts that relate to metadata communication by a memory device as described with reference to FIGS. 5 through 6.

FIG. 1 illustrates an example of a system 100 that supports metadata communication by a memory device in accordance with examples as disclosed herein. The system 100 may include a host device 105, a memory device 110, and a plurality of channels 115 coupling the host device 105 with the memory device 110. The system 100 may include one or more memory devices 110, but aspects of the one or more memory devices 110 may be described in the context of a single memory device (e.g., memory device 110).

The system 100 may include portions of an electronic device, such as a server, a device within or as part of a server, a computing device, a mobile computing device, a wireless device, a graphics processing device, a vehicle, or other systems. For example, the system 100 may illustrate aspects of a computer, a laptop computer, a tablet computer, a smartphone, a cellular phone, a wearable device, an internet-connected device, a vehicle controller, or the like. The memory device 110 may be a component of the system 100 that is operable to store data for one or more other components of the system 100.

Portions of the system 100 may be examples of the host device 105. The host device 105 may be an example of a processor (e.g., circuitry, processing circuitry, a processing component) within a device that uses memory to execute processes, such as within a server, a device within or as part of a server, a computing device, a mobile computing device, a wireless device, a graphics processing device, a computer, a laptop computer, a tablet computer, a smartphone, a cellular phone, a wearable device, an internet-connected device, a vehicle controller, a system on a chip (SoC), or some other stationary or portable electronic device, among other examples. In some examples, the host device 105 may refer to the hardware, firmware, software, or any combination thereof that implements the functions of an external memory controller 120. In some examples, the external memory controller 120 may be referred to as a host (e.g., host device 105).

A memory device 110 may be an independent device or a component that is operable to provide physical memory addresses/space that may be used or referenced by the system 100. In some examples, a memory device 110 may be configurable to work with one or more different types of host devices. Signaling between the host device 105 and the memory device 110 may be operable to support one or more of: modulation schemes to modulate the signals, various pin configurations for communicating the signals, various form factors for physical packaging of the host device 105 and the memory device 110, clock signaling and synchronization between the host device 105 and the memory device 110, timing conventions, or other functions.

The memory device 110 may be operable to store data for the components of the host device 105. In some examples, the memory device 110 (e.g., operating as a secondary-type device to the host device 105, operating as a dependent-type device to the host device 105) may respond to and execute commands provided by the host device 105 through one or more external memory controllers 120. Such commands may include one or more of a write command for a write operation, a read command for a read operation, a refresh command for a refresh operation, or other commands.

The host device 105 may include one or more of one or more external memory controllers 120, one or more processors 125, a basic input/output system (BIOS) component 130, or other components such as one or more peripheral components or one or more input/output controllers. The components of the host device 105 may be coupled with one another using a bus 135.

The one or more processors 125 may be operable to provide functionality (e.g., control functionality) for the system 100 or the host device 105. The one or more processors 125 may be a general-purpose processor, a digital signal processor (DSP), an application-specific integrated circuit (ASIC), a field-programmable gate array (FPGA) or other programmable logic device, discrete gate or transistor logic, discrete hardware components, or any combination of these components. In such examples, the one or more processors 125 may be an example of a central processing unit (CPU), a graphics processing unit (GPU), a general purpose GPU (GPGPU), or an SoC, among other examples. In some examples, the one or more external memory controllers 120 may be implemented by or be a part of the one or more processors 125.

The BIOS component 130 may be a software component that includes a BIOS operated as firmware, which may initialize and run various hardware components of the system 100 or the host device 105. The BIOS component 130 may also manage data flow between the processor 125 and the various components of the system 100 or the host device 105. The BIOS component 130 may include instructions (e.g., a program, software) stored in one or more of read-only memory (ROM), flash memory, or other non-volatile memory.

The memory device 110 may include one or more device memory controllers 155 and one or more memory dies 160 (e.g., memory chips) to support a capacity (e.g., a desired capacity, a specified capacity) for data storage. Each memory die 160 (e.g., memory die 160-a, memory die 160-b, memory die 160-N) may include one or more local memory controllers 165 (e.g., local memory controller 165-a, local memory controller 165-b, local memory controller 165-N) and one or more memory arrays 170 (e.g., memory array 170-a, memory array 170-b, memory array 170-N). A memory array 170 may be a collection (e.g., one or more grids, one or more banks, one or more tiles, one or more sections) of memory cells, with each memory cell being operable to store one or more bits of data. A memory device 110 including two or more memory dies 160 may be referred to as a multi-die memory or a multi-die package or a multi-chip memory or a multi-chip package.

One or more device memory controllers 155 may include components (e.g., circuitry, logic) operable to control operation of the memory device 110. The device memory controller 155 may include hardware, firmware, or instructions that enable the memory device 110 to perform various operations and may be operable to receive, transmit, or execute commands, data, or control information related to the components of the memory device 110. The device memory controller 155 may be operable to communicate with one or more of the external memory controller 120, the one or more memory dies 160, or the processor 125. In some examples, the device memory controller 155 may control operation of the memory device 110 described herein in conjunction with the local memory controller 165 of the memory die 160.

In some examples, the memory device 110 may communicate information (e.g., data, commands, or both) with the host device 105. For example, the memory device 110 may receive a write command indicating that the memory device 110 is to store data received from the host device 105, or receive a read command indicating that the memory device 110 is to provide data stored in a memory die 160 to the host device 105, among other types of information communication.

One or more local memory controllers 165 (e.g., local to a memory die 160) may include components (e.g., circuitry, logic) operable to control operation of the memory die 160. In some examples, a local memory controller 165 may be operable to communicate (e.g., receive or transmit data or commands or both) with the device memory controller 155. In some examples, a memory device 110 may not include a device memory controller 155, and one or more local memory controllers 165 or the external memory controller 120 may perform various functions described herein. As such, one or more local memory controllers 165 may be operable to communicate with the device memory controller 155, with other local memory controllers 165, or directly with one or more external memory controllers 120, or one or more processors 125, or any combination thereof. Examples of components that may be included in the device memory controller 155 or the local memory controllers 165 or both may include receivers for receiving signals (e.g., from the external memory controller 120), transmitters for transmitting signals (e.g., to the external memory controller 120), decoders for decoding or demodulating received signals, encoders for encoding or modulating signals to be transmitted, or various other components operable for supporting described operations of the device memory controller 155 or local memory controller 165 or both.

The external memory controller 120 may be operable to enable communication of information (e.g., data, commands, or both) between components of the system 100 (e.g., between components of the host device 105, such as the processor 125, and the memory device 110). The external memory controller 120 may process (e.g., convert, translate) communications exchanged between the components of the host device 105 and the memory device 110. In some examples, the external memory controller 120, or other component of the system 100 or the host device 105, or its functions described herein, may be implemented by the processor 125. For example, the external memory controller 120 may be hardware, firmware, or software, or some combination thereof implemented by the processor 125 or other component of the system 100 or the host device 105. Although the external memory controller 120 is depicted as being external to the memory device 110, in some examples, the external memory controller 120, or its functions described herein, may be implemented by one or more components of a memory device 110 (e.g., a device memory controller 155, a local memory controller 165) or vice versa.

The components of the host device 105 may exchange information with the memory device 110 using one or more channels 115. The channels 115 may be operable to support communications between the external memory controller 120 and the memory device 110. Each channel 115 may be an example of a transmission medium that carries information between the host device 105 and the memory device 110. Each channel 115 may include one or more signal paths (e.g., a transmission medium, a conductor) between terminals associated with the components of the system 100. A signal path may be an example of a conductive path operable to carry a signal. For example, a channel 115 may be associated with a first terminal (e.g., including one or more pins, including one or more pads) at the host device 105 and a second terminal at the memory device 110. A terminal may be an example of a conductive input or output point of a device of the system 100, and a terminal may be operable to act as part of a channel.

Channels 115 (and associated signal paths and terminals) may be dedicated to communicating one or more types of information. For example, the channels 115 may include one or more command and address (CA) channels 186, one or more clock signal (CK) channels 188, one or more data (DQ) channels 190, one or more other channels 192, or any combination thereof. In some examples, signaling may be communicated over the channels 115 using single data rate (SDR) signaling or double data rate (DDR) signaling. In SDR signaling, one modulation symbol (e.g., signal level) of a signal may be registered for each clock cycle (e.g., on a rising or falling edge of a clock signal). In DDR signaling, two modulation symbols (e.g., signal levels) of a signal may be registered for each clock cycle (e.g., on both a rising edge and a falling edge of a clock signal).

In some examples, the memory device 110 may store metadata for data along with the data. For example, in addition to storing data in a memory die 160, the memory device 110 may also store metadata associated with (e.g., for) the data in the memory die 160. Metadata may refer to information about data. So, the metadata for a set of data may refer to information about that set of information. Metadata may include data size information, data type information, data pointer information, data protection information, and the like. The metadata stored may be used by the memory device 110 (among other devices or systems) to improve overall system reliability, performance, and/or efficiency, among other benefits.

The memory device 110 may store both data and corresponding metadata in the memory dies 160. To communicate the metadata from different memory dies 160, the memory device 110 may, according to the techniques described herein, aggregate the metadata from the memory dies 160 at the logic component (e.g., using a buffer of the logic component) so that the memory device 110 can transmit the metadata over one or more metadata pins that are shared between the memory dies. Using shared metadata pins to communicate metadata from multiple memory dies may provide various advantages relative to other techniques. For instance, using shared metadata pins to communicate metadata from multiple memory dies, rather than using memory die-specific metadata pins, may allow the size of the interface between the memory device 110 and the host device 105 to remain unchanged while augmenting the functionality of the memory device 110. As another example, using shared metadata pins to communicate metadata from multiple memory dies, rather than communicating the metadata over data pins, may preserve the transmission bandwidth of the memory device 110.

Although described with reference to the transmission of metadata by the memory device 110, the metadata pins may additionally or alternatively be used for receiving metadata from a host device (e.g., the metadata pins may support bi-directional communications).

Figure 2:
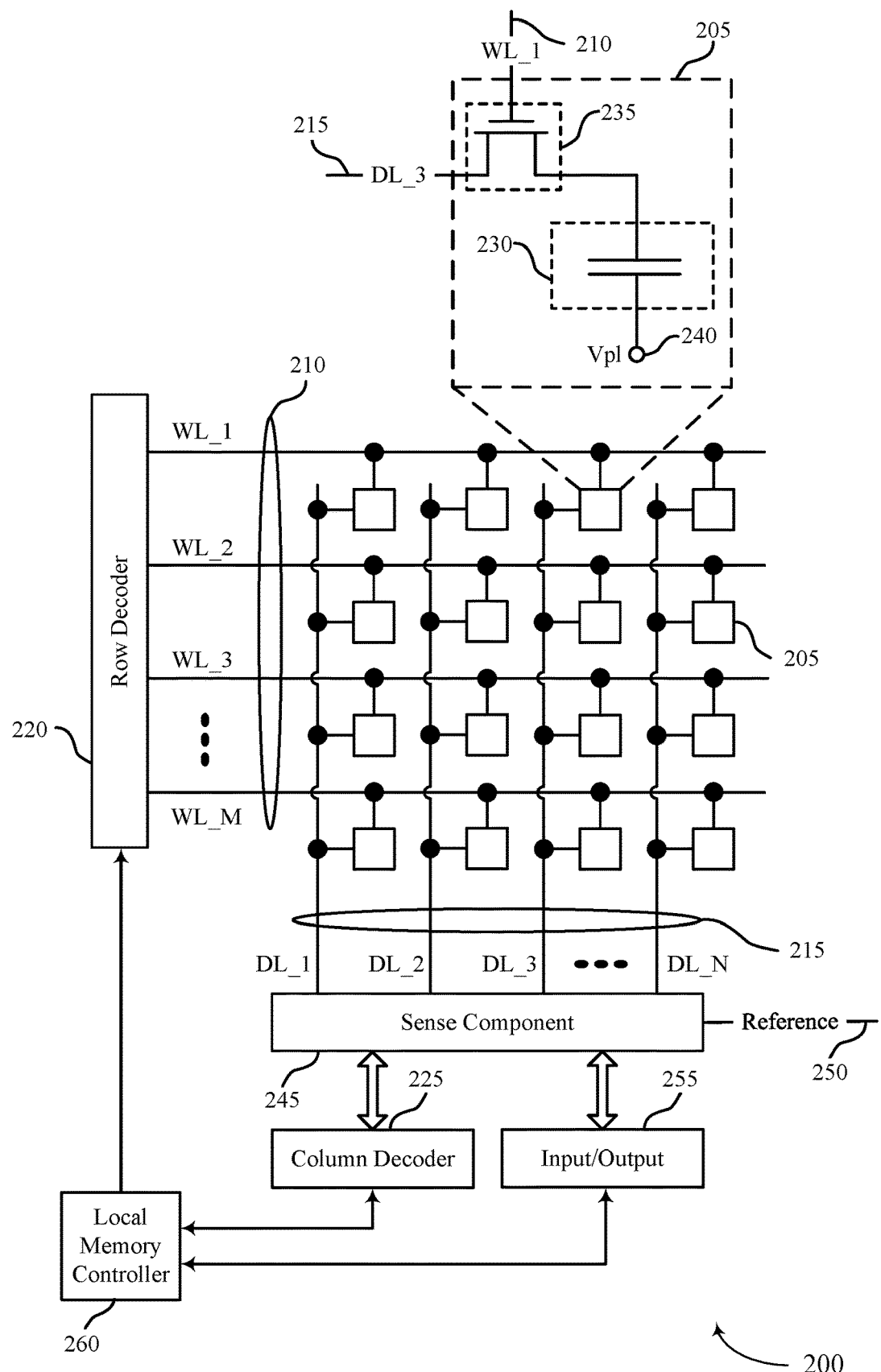
FIG. 2 illustrates an example of a memory die that supports metadata communication by a memory device in accordance with examples as disclosed herein.

FIG. 2 illustrates an example of a memory die 200 that supports metadata communication by a memory device in accordance with examples as disclosed herein. The memory die 200 may be an example of the memory dies 160 described with reference to FIG. 1. In some examples, the memory die 200 may be referred to as a memory chip, a memory device, or an electronic memory apparatus. The memory die 200 may include one or more memory cells 205 that may be programmable to store different logic states (e.g., programmed to one of a set of two or more possible states). For example, a memory cell 205 may be operable to store one bit of information at a time (e.g., a logic 0 or a logic 1). In some examples, a memory cell 205 (e.g., a multi-level memory cell) may be operable to store more than one bit of information at a time (e.g., a logic 00, logic 01, logic 10, a logic 11). In some examples, the memory cells 205 may be arranged in an array, such as a memory array 170 described with reference to FIG. 1.

In some examples, a memory cell 205 may store a charge representative of the programmable states in a capacitor. DRAM architectures may include a capacitor that includes a dielectric material to store a charge representative of the programmable state. In other memory architectures, other storage devices and components are possible. For example, nonlinear dielectric materials may be employed. The memory cell 205 may include a logic storage component, such as capacitor 230, and a switching component 235 (e.g., a cell selection component). The capacitor 230 may be an example of a dielectric capacitor or a ferroelectric capacitor. A node of the capacitor 230 may be coupled with a voltage source 240, which may be the cell plate reference voltage, such as Vpl, or may be ground, such as Vss.

The memory die 200 may include access lines (e.g., word lines 210, digit lines 215) arranged in a pattern, such as a grid-like pattern. An access line may be a conductive line coupled with a memory cell 205 and may be used to perform access operations on the memory cell 205. In some examples, word lines 210 may be referred to as row lines. In some examples, digit lines 215 may be referred to as column lines or bit lines. References to access lines, row lines, column lines, word lines, digit lines, or bit lines, or their analogues, are interchangeable without loss of understanding. Memory cells 205 may be positioned at intersections of the word lines 210 and the digit lines 215.

Operations such as reading and writing may be performed on the memory cells 205 by activating access lines such as a word line 210 or a digit line 215. By biasing a word line 210 and a digit line 215 (e.g., applying a voltage to the word line 210 or the digit line 215), a single memory cell 205 may be accessed at their intersection. The intersection of a word line 210 and a digit line 215 in a two-dimensional or in a three-dimensional configuration may be referred to as an address of a memory cell 205. Activating a word line 210 or a digit line 215 may include applying a voltage to the respective line.

Accessing the memory cells 205 may be controlled through a row decoder 220, or a column decoder 225, or any combination thereof. For example, a row decoder 220 may receive a row address from the local memory controller 260 and activate a word line 210 based on the received row address. A column decoder 225 may receive a column address from the local memory controller 260 and may activate a digit line 215 based on the received column address.

Selecting or deselecting the memory cell 205 may be accomplished by activating or deactivating the switching component 235 using a word line 210. The capacitor 230 may be coupled with the digit line 215 using the switching component 235. For example, the capacitor 230 may be isolated from digit line 215 when the switching component 235 is deactivated, and the capacitor 230 may be coupled with digit line 215 when the switching component 235 is activated.

The sense component 245 may be operable to detect a state (e.g., a charge) stored on the capacitor 230 of the memory cell 205 and determine a logic state of the memory cell 205 based on the stored state. The sense component 245 may include one or more sense amplifiers to amplify or otherwise convert a signal resulting from accessing the memory cell 205. The sense component 245 may compare a signal detected from the memory cell 205 to a reference 250 (e.g., a reference voltage). The detected logic state of the memory cell 205 may be provided as an output of the sense component 245 (e.g., to an input/output 255), and may indicate the detected logic state to another component of a memory device (e.g., a memory device 110) that includes the memory die 200.

The local memory controller 260 may control the accessing of memory cells 205 through the various components (e.g., row decoder 220, column decoder 225, sense component 245). The local memory controller 260 may be an example of the local memory controller 165 described with reference to FIG. 1. In some examples, one or more of the row decoder 220, column decoder 225, and sense component 245 may be co-located with the local memory controller 260. The local memory controller 260 may be operable to receive one or more of commands or data from one or more different memory controllers (e.g., an external memory controller 120 associated with a host device 105, another controller associated with the memory die 200), translate the commands or the data (or both) into information that can be used by the memory die 200, perform one or more operations on the memory die 200, and communicate data from the memory die 200 to a host (e.g., a host device 105) based on performing the one or more operations. The local memory controller 260 may generate row signals and column address signals to activate the target word line 210 and the target digit line 215. The local memory controller 260 also may generate and control various signals (e.g., voltages, currents) used during the operation of the memory die 200. In general, the amplitude, the shape, or the duration of an applied voltage or current discussed herein may be varied and may be different for the various operations discussed in operating the memory die 200.

The local memory controller 260 may be operable to perform one or more access operations on one or more memory cells 205 of the memory die 200. Examples of access operations may include a write operation, a read operation, a refresh operation, a precharge operation, or an activate operation, among others. In some examples, access operations may be performed by or otherwise coordinated by the local memory controller 260 in response to various access commands (e.g., from a host device 105). The local memory controller 260 may be operable to perform other access operations not listed here or other operations related to the operating of the memory die 200 that are not directly related to accessing the memory cells 205.

In some examples, a memory device may include multiple memory dies 200, for example, in a memory module. If the memory device is configured in a metadata mode (e.g., via signaling, via a mode register), the memory device may support the communication and storage of metadata. To communicate metadata from multiple memory dies 200, the memory device may use one or more metadata pins that are configured to convey metadata from multiple dies 200. In some examples, the memory device may also transmit error detection bits (e.g., CRC bits) or other information over the metadata pins. If the memory device is not configured in the metadata mode, the metadata pins may be at least temporarily repurposed to communicate data or other types of information.

Figure 3:
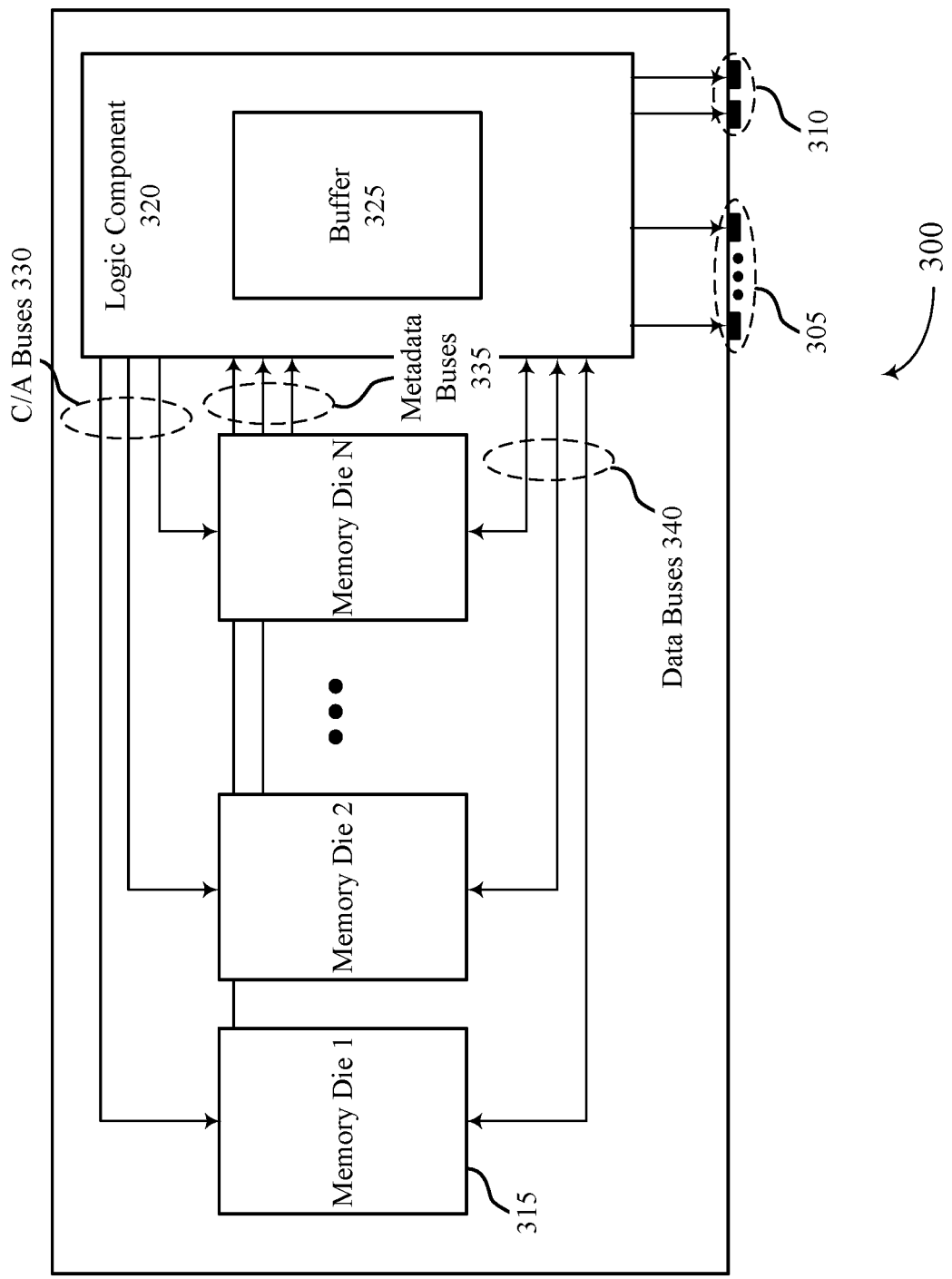
FIG. 3 illustrates an example of a memory device that supports metadata communication in accordance with examples as disclosed herein.

FIG. 3 illustrates an example of a memory device 300 that supports metadata communication in accordance with examples as disclosed herein. The memory device 300 may be an example of a memory device 110 as described with reference to FIG. 1. Alternatively, the memory device 300 may be an example of a memory module included in memory device 110. The memory device 300 may be coupled with a host device via an interface (e.g., an edge connector) that includes data pins 305 and metadata pins 310. The memory device 300 may include multiple memory dies 315, which may be examples of the memory dies 160 and 200 described herein. According to the techniques described herein, the memory device 30 may use the metadata pins 310 to transmit metadata from multiple memory dies 315 and to receive metadata for multiple memory dies 315.

The memory device 300 may include memory dies 315 (e.g., memory die 1 through memory die N) that are configured to store information (e.g., data, metadata) for a host device. The memory device 300 may control various operations of the memory dies 315 via the logic component 320, which may be a local controller. For example, the logic component 320 may communicate command and address (C/A) information to the memory dies 315 via the C/A buses 330 and may exchange data with the memory dies 315 via the data buses 340. In some examples, the logic component 320 may exchange metadata with the memory dies 315 via the metadata buses 335. For example, each memory die 315 may be coupled with a respective metadata bus 335 over which metadata associated with the memory die 315 is exchanged with the logic component 320. Alternatively, the logic component 320 may exchange metadata with the memory dies 315 via the data buses 340 (in which case some or all of the metadata buses 335 may be omitted).

The logic component 320 may include a buffer 325, which may be an example of a storage component such as a local memory array. The buffer 325 may be configured to accumulate (e.g., aggregate) data and metadata from the memory dies 315 (or for the memory dies 315). For example, the buffer 325 may be configured to combine data from different memory dies 315 into a set of data for transmission over the data pins 305, which may be configured to transmit data. Similarly, the buffer 325 may be configured to combine metadata from different memory dies 315 into a set of metadata for transmission over the metadata pins 310, which may be configured to transmit metadata. In some examples, the memory device 300 may be configured to transmit information over a pin in predefined amounts referred to as the burst length. For example, the memory device 300 may be configured to transmit information over a pin in sets of 32 bits. By transmitting over multiple pins concurrently, the memory device 300 may increase the bandwidth of transmission.

In response to receiving a request (e.g., a read command) for a set of data from a host device, the logic component 320 may retrieve the set of data from the memory dies 315. For example, the logic component 320 may transmit command and address information (e.g., via the C/A buses 330) to the memory dies 315 so that subsets of the set of data are transmitted (e.g., via the data buses 340) from the memory dies 315 to the logic component 320. The logic component 320 may also retrieve metadata for the set of data in a similar fashion. The subsets of data received from the memory dies 315 may be combined into the set of data by the buffer 325 for transmission over the data pins 305. For instance, the buffer 325 may combine subsets of data from memory die 1 through memory die N into a set of data for transmission over the data pins 305. Similarly, the metadata received from the memory dies 315 may be combined into a set of metadata by the buffer 325 for transmission over the metadata pins 310. For instance, the buffer 325 may combine subsets of metadata from memory die 1 through memory die N into a set of metadata for transmission over the metadata pins 310.

By using separate pins for data and metadata, the memory device 300 may transmit the metadata for the data concurrently with the data, which may improve the bandwidth of the memory device 300. For example, transmitting metadata over the metadata pins 310, instead of transmitting the metadata over the data pins 305 (e.g., by appending the metadata to the data) may allow the memory device 300 to transmit both the set of data and the metadata using an existing burst length configured for the memory device 300. By using shared metadata pins for the memory dies 315, rather than respective metadata pins for each memory die 315, the memory device 300 may reduce the size of the interface that includes the pins.

In some examples, the memory device 300 may receive from the host device a set of data, a corresponding set of metadata, and a request (e.g., a write command) to store the set of data and the set of metadata. For example, the memory device 300 may receive the set of data over the data pins 305 and may receive the set of metadata over the metadata pins 310. The set of data and the set of metadata may be for multiple memory dies 315. For example, the set of data and the set of metadata may be for memory die 1 through memory die N or a subset of the memory dies 315. Based on (e.g., in response to) the write command, the memory device 300 may transmit the set of data and the set of metadata to the associated memory dies 315. For example, the logic component 320 may transmit a first subset of the set of data and a first subset of the set of metadata to memory die 1, may transmit a second subset of the set of data and a second subset of the set of metadata to memory die 2, and so on and so forth.

In addition to communicating metadata over the metadata pins 310, the memory device 300 may also communicate error detection bits, such as CRC bits, that enable detection of errors that occur during propagation (e.g., during transmission between the host device and the memory device 300). For example, before transmitting a set of data and corresponding metadata, the memory device 300 may (via the logic component 320) generate CRC bits for the set of data, for the metadata, or for both. The CRC bits for a set of information may be generated based on (e.g., as a function of) that set of information. The memory device 300 may then transmit the CRC bits over the metadata pins 310 during a burst in accordance with a burst length of the memory device 300. For example, if the burst length is 32 bits per pin and the memory device has 40 bits of metadata, the memory device 300 may transmit the CRC bits in the last twelve time slots for two metadata pins (or in the last 24 time slots for a single metadata pin, among other options).

The mapping (e.g., correspondence) between data and metadata may be preconfigured at the memory device 300, indicated by a mode register of the memory device 300, signaled to the memory device 300, or signaled by the memory device 300.

So, the memory device 300 may more fully utilize the capacity of the metadata pins 310 by transmitting both metadata and CRC bits over the metadata pins 310 during a transmission burst. Generating the CRC bits at the logic component 320 may be faster compared to generating the CRC bits locally at each memory die 315 (e.g., due to the logic component 320 being manufactured on a faster CMOS process relative to the memory dies 315). Because the relative quantity of CRC bits needed to protect a set of information bits (e.g., data bits, metadata bits) decreases as the quantity of information bits increases, generating CRC bits for an entire set of information (which is enabled by generating CRC bits at the logic component 320) may be more efficient than generating CRC bits on a subset-basis. Additionally, generating the CRC bits at the logic component 320 may free up space on the memory dies 315 (e.g., for more memory cells) that might otherwise be allocated for CRC circuitry.

In addition to transmitting CRC bits over the metadata pins 310, the memory device 300 may also receive CRC bits over the metadata pins 310. For example, the memory device 300 may receive CRC bits for a set of data, for a corresponding set of metadata, or for both. Upon receiving a first CRC bits for a set of information, the memory device 300 may generate (e.g., via the logic component 320) a second set of CRC bits for the set of information. The second set of CRC bits may be based on (e.g., a function of) the set of information received from the host device. The memory device 300 may compare the second set of CRC bits with the first set of CRC bits and determine an error status of the set of information based on the comparison. For example, if the second set of CRC bits matches (e.g., is equal to, is the same as) the first set of CRC bits, the memory device 300 may determine that the set of information is error-free. If the second set of CRC bits does not match (e.g., is different than) the first set of CRC bits, the memory device 300 may determine that the set of information has an error. Accordingly, the memory device 300 may request that the host device re-transmit the set of information.

In some examples, the memory device 300 may support different operating modes. For instance, the memory device 300 may support a metadata mode in which the memory device 300 stores metadata for the host device. The memory device 300 may also support a non-metadata mode in which the memory device 300 does not store metadata for the host device. If the memory device 300 is configured in the metadata mode, the memory device 300 may communicate (e.g., transmit, receive) metadata over the metadata pins 310. If the memory device 300 is configured in the non-metadata mode, the memory device 300 may re-purpose the metadata pins 310 and send other types of information (e.g., data, error correction code (ECC) bits) over the metadata pins. The operating mode of the memory device 300 may be indicated to the memory device 300 via control signaling from the host device or via one or more mode register bits, among other options.

Thus, the memory device 300 may use metadata pins allocated for multiple memory dies to transmit and receive metadata associated with the multiple memory dies.

Figure 4:
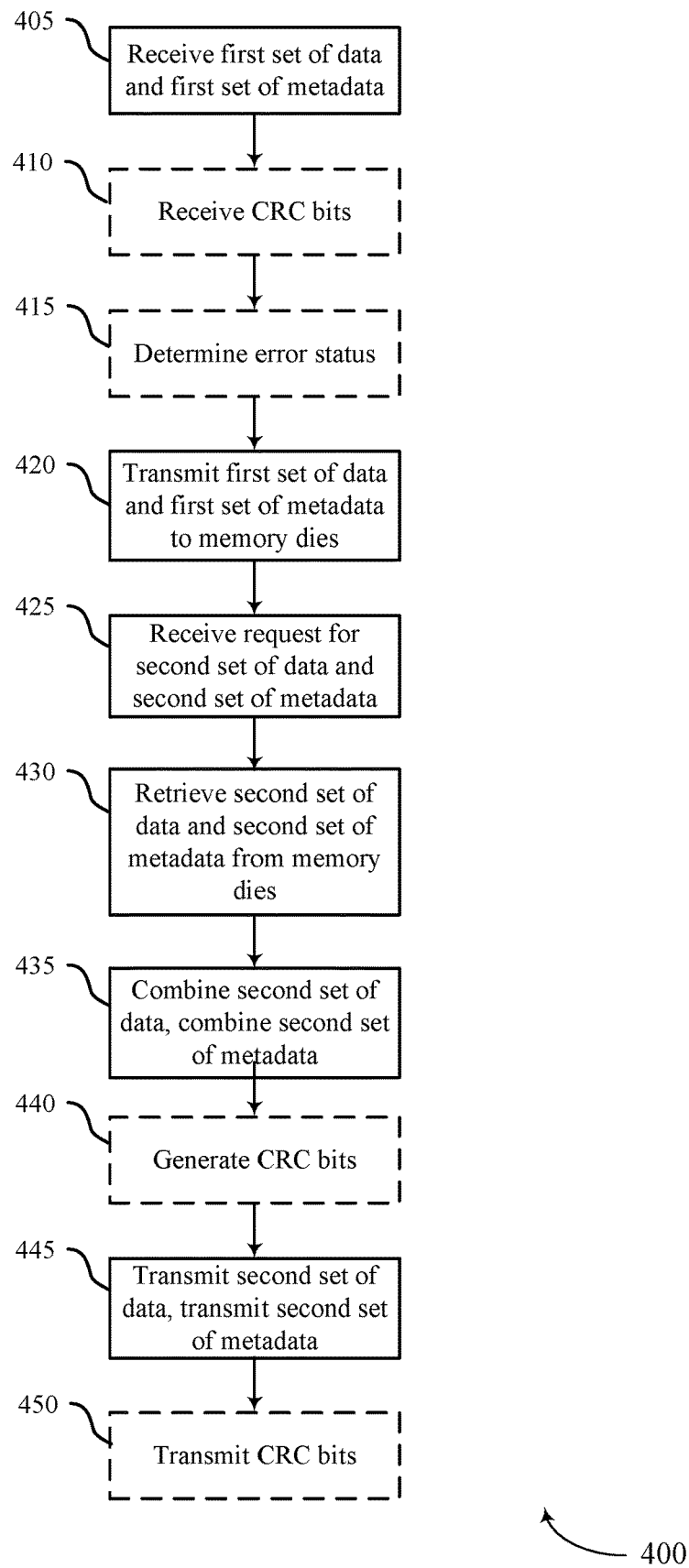
FIG. 4 illustrates an example of a process flow that supports metadata communication by a memory device in accordance with examples as disclosed herein.

FIG. 4 illustrates an example of a process flow 400 that supports metadata communication by a memory device in accordance with examples as disclosed herein. The process flow 400 may be implemented by a memory device as described herein. For example, the process flow 400 may be implemented by a memory device 110 as described with reference to FIG. 1 or a memory device 300 as described with reference to FIG. 3. The memory device may include one or more metadata pins that are allocated for a set of memory dies included in a memory module of the memory device. The memory device may implement aspects of the process flow 400 to communicate (e.g., transmit, receive) metadata and potentially CRC bits over the metadata pins.

Aspects of the process flow 400 may be implemented by a controller, among other components. Additionally or alternatively, aspects of the process flow 400 may be implemented as instructions stored in memory (e.g., firmware stored in a memory coupled with a memory device or a memory system). For example, the instructions, if executed by a controller (e.g., a local memory controller 165), may cause the controller to perform the operations of the process flow 400.

At 405, the memory device may receive (e.g., via a logic component) a first set of data and a first set of metadata for (e.g., associated with, corresponding to, related to) the first set of data. The memory device may also receive a request to store the set of data and the first set of metadata. The first set of data may include first data for (e.g., addressed to, to be stored in) a first memory die and second data for a second memory die. Accordingly, the first set of metadata may include first metadata for the first data (and thus for the first memory die) and second metadata for the second data (and thus for the second memory die). The first set of data may be received over data pins and the first set of metadata may be received over the metadata pins. In some examples, the first set of data and the first set of metadata may be received concurrently (e.g., during partially or wholly overlapping times).

In some examples, the memory device may, at 410, receive a first set of CRC bits over the metadata pins. The first set of CRC bits may be for the first set of data, the first set of metadata, or both. At 415, the memory device may determine an error status for the first set of data, the first set of metadata, or both, based on the first set of CRC bits. For example, the memory device may (e.g., via the logic component) generate a second set of CRC bits that the memory device compares to the first set of CRC bits. The second set of CRC bits may be generated based on (e.g., as a function of) the first set of data, the first set of metadata, or both. If the second set of CRC bits matches the first set of CRC bits, the memory device may determine that the information received at 405 is errorless and may proceed to store the information in the memory dies. If the second set of CRC bits does not match the first set of CRC bits, the memory device may determine that the information received at 405 has an error and may request a retransmission of the information.

At 420, the memory device may transmit the first set of data and the first set of metadata to the memory dies for storage. For example, the memory device may transmit the first data and the first metadata to the first memory die for storage and may transmit the second data and the second metadata to the second memory die for storage. The memory device may then store the first data and the first metadata in the first memory die and may store the second data and the second metadata in the second memory die.

At 425, the memory device may receive a request for a second set of data and a second set of metadata for the second set of data. The second set of data may include third data from a third memory die and fourth data from a fourth memory die. The second set of metadata may include third metadata for the third data (and thus from the third memory die) and fourth metadata for the fourth data (and thus from the fourth memory die). At 430, the memory device may, based on (e.g., in response to) the request, retrieve the second set of data and the second set of metadata from the memory dies. For example, the memory device may retrieve the third data and the third metadata from the third memory die and may retrieve the fourth data and the fourth metadata from the fourth memory die. Retrieving information from a memory die may involve transmitting (e.g., by the logic component) a request for the information to the memory die and receiving the information from the memory die (e.g., at the logic component). In some cases, the third memory die is the first memory die and the fourth memory die is the second memory die.

At 435, the memory device may (e.g., via the buffer) combine the third data and the fourth data into the second set of data. The memory device may also (e.g., via the buffer) combine the third metadata and the fourth metadata into the second set of metadata. At 440, the memory device may generate a set of CRC bits for the second set of data, for the second set of metadata, or both.

At 445, the memory device may transmit the second set of data and the second set of metadata data. For example, the memory device may transmit the second set of data over the data pins and may transmit the second set of metadata over the metadata pins. The second set of metadata may be transmitted concurrently with the second set of data. In some examples, the memory device may, at 450, transmit the set of CRC bits generated at 440. The set of CRC bits may be transmitted over the metadata pins. In some examples, the set of CRC bits may be transmitted concurrently with the second set of data.

Thus, the memory device or the broader memory system may transmit combined metadata from multiple memory dies over one or more metadata pins allocated for the memory dies. Alternative examples of the foregoing may be implemented, where some operations are performed in a different order than described, are performed in parallel, or are not performed at all. In some cases, operations may include additional features not mentioned herein, or further operations may be added. Additionally, certain operations may be performed multiple times or certain combinations of operations may repeat or cycle.

Figure 5:
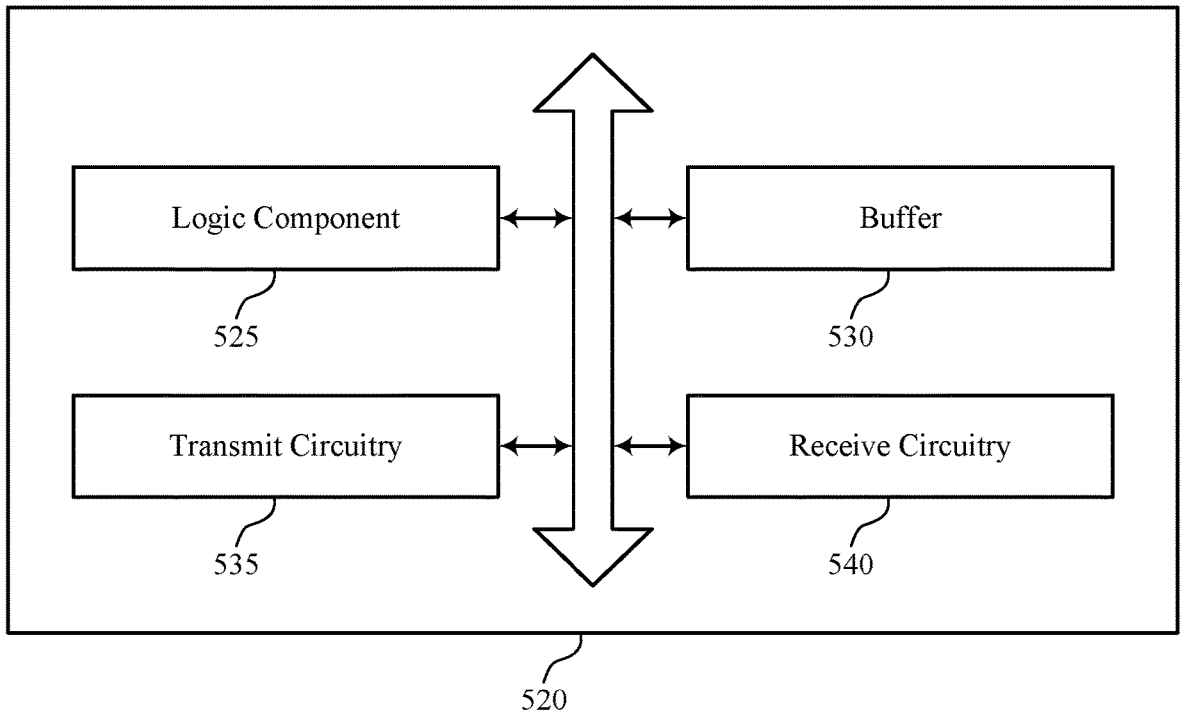
FIG. 5 illustrates a block diagram of a memory device that supports metadata communication by a memory device in accordance with examples as disclosed herein.

FIG. 5 illustrates a block diagram 500 of a memory device 520 that supports metadata communication by a memory device in accordance with examples as disclosed herein. The memory device 520 may be an example of aspects of a memory device as described with reference to FIGS. 1 through 4. The memory device 520, or various components thereof, may be an example of means for performing various aspects of metadata communication by a memory device as described herein. For example, the memory device 520 may include a logic component 525, a buffer 530, a transmit circuitry 535, a receive circuitry 540, or any combination thereof. Each of these components may communicate, directly or indirectly, with one another (e.g., via one or more buses).

The logic component 525 may be configured as or otherwise support a means for receiving, at a logic component including a buffer, first data from a first memory die and second data from a second memory die. In some examples, the logic component 525 may be configured as or otherwise support a means for receiving, at the logic component, first metadata for the first data from the first memory die and second metadata for the second data from the second memory die. The buffer 530 may be configured as or otherwise support a means for combining, at the buffer, the first metadata from the first memory die and the second metadata from the second memory die into a set of metadata. The transmit circuitry 535 may be configured as or otherwise support a means for transmitting, to a host device via a metadata pin allocated for a set of memory dies including the first memory die and the second memory die, the set of metadata including the first metadata from the first memory die and the second metadata from the second memory die.

In some examples, the transmit circuitry 535 may be configured as or otherwise support a means for transmitting, to the host device over one or more data pins, the first data, the second data, or both, concurrently with transmitting the set of metadata.

In some examples, the logic component 525 may be configured as or otherwise support a means for generating CRC bits for a set of data including the first data from the first memory die and the second data from the second memory die. In some examples, the transmit circuitry 535 may be configured as or otherwise support a means for transmitting, over the metadata pin, the CRC bits for the set of data including the first data from the first memory die and the second data from the second memory die.

In some examples, the logic component 525 may be configured as or otherwise support a means for generating CRC bits for the set of metadata including the first metadata from the first memory die and the second metadata from the second memory die. In some examples, the transmit circuitry 535 may be configured as or otherwise support a means for transmitting, over the metadata pin, the CRC bits for the set of metadata including the first metadata from the first memory die and the second metadata from the second memory die.

In some examples, the set of memory dies includes a third memory die, and the logic component 525 may be configured as or otherwise support a means for receiving third data and third metadata for the third data from the third memory die, where the third metadata is combined into the set of metadata and transmitted over the metadata pin.

In some examples, the receive circuitry 540 may be configured as or otherwise support a means for receiving, over the metadata pin, third metadata for third data to be stored in the first memory die and fourth metadata for fourth data to be stored in the second memory die. In some examples, the transmit circuitry 535 may be configured as or otherwise support a means for transmitting the third data and the third metadata to the first memory die for storage, and the fourth data and the fourth metadata to the second memory die for storage.

In some examples, the receive circuitry 540 may be configured as or otherwise support a means for receiving, over the metadata pin, CRC bits for a second set of data that includes third data for storage at the first memory die and that includes for fourth data for storage at the second memory die. In some examples, the logic component 525 may be configured as or otherwise support a means for determining an error status for the second set of data based at least in part on the CRC bits for the second set of data.

In some examples, the receive circuitry 540 may be configured as or otherwise support a means for receiving, over the metadata pin, CRC bits for a second set of metadata that includes third metadata for the third data and that includes fourth metadata for the fourth data. In some examples, the logic component 525 may be configured as or otherwise support a means for determining an error status for the second set of metadata based at least in part on the CRC bits for the second set of metadata.

In some examples, the logic component 525 may be configured as or otherwise support a means for receiving, at the logic component, a request for the first data and the second data, where the first data, the first metadata, the second data, and the second metadata are received based at least in part on the request.

Figure 6:
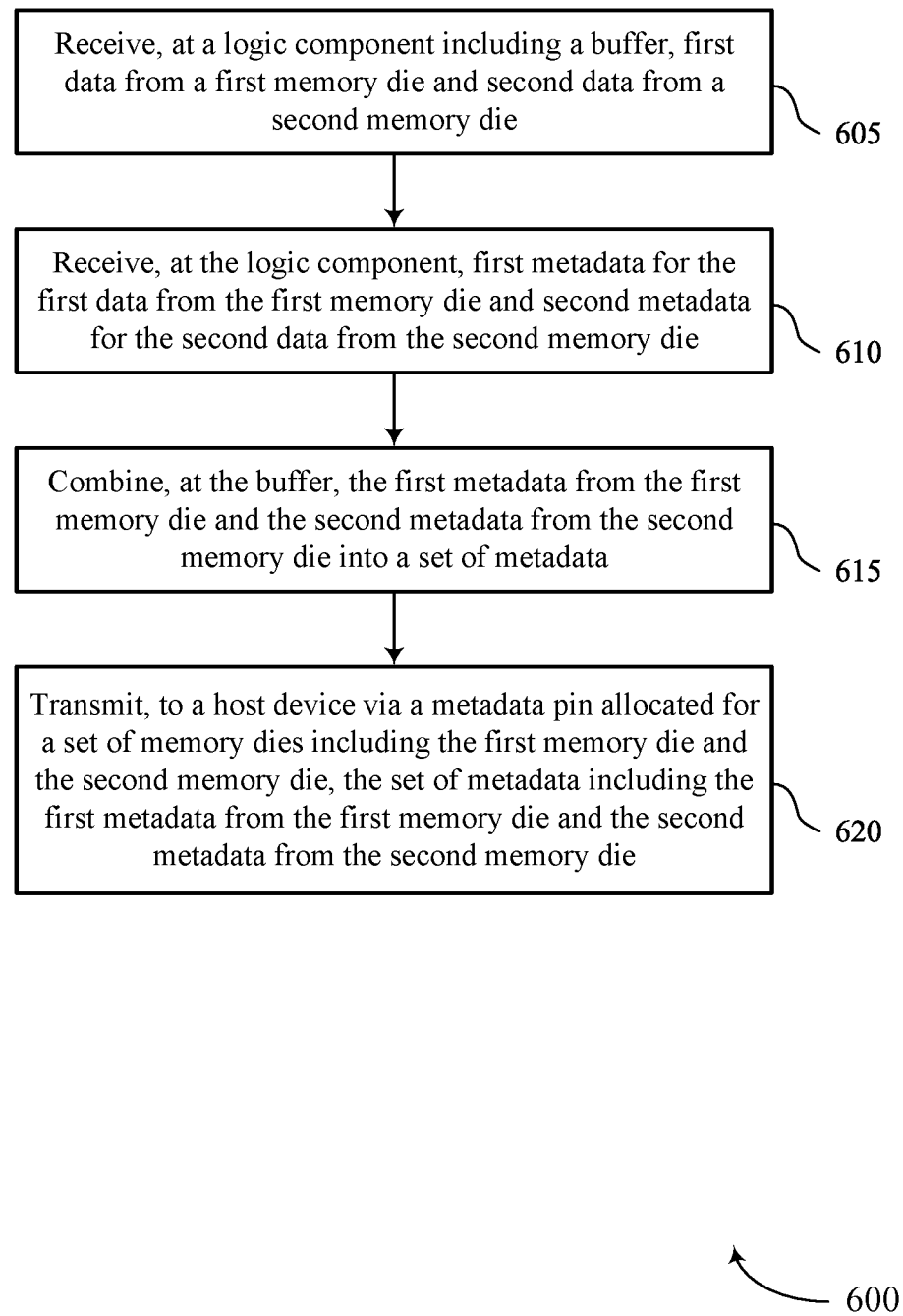
FIG. 6 illustrates a flowchart showing a method or methods that support metadata communication by a memory device in accordance with examples as disclosed herein.

FIG. 6 illustrates a flowchart showing a method 600 that supports metadata communication by a memory device in accordance with examples as disclosed herein. The operations of method 600 may be implemented by a memory device or its components as described herein. For example, the operations of method 600 may be performed by a memory device as described with reference to FIGS. 1 through 5. In some examples, a memory device may execute a set of instructions to control the functional elements of the device to perform the described functions. Additionally, or alternatively, the memory device may perform aspects of the described functions using special-purpose hardware.

At 605, the method may include receiving, at a logic component including a buffer, first data from a first memory die and second data from a second memory die. The operations of 605 may be performed in accordance with examples as disclosed herein. In some examples, aspects of the operations of 605 may be performed by a logic component 525 as described with reference to FIG. 5.

At 610, the method may include receiving, at the logic component, first metadata for the first data from the first memory die and second metadata for the second data from the second memory die. The operations of 610 may be performed in accordance with examples as disclosed herein. In some examples, aspects of the operations of 610 may be performed by a logic component 525 as described with reference to FIG. 5.

At 615, the method may include combining, at the buffer, the first metadata from the first memory die and the second metadata from the second memory die into a set of metadata. The operations of 615 may be performed in accordance with examples as disclosed herein. In some examples, aspects of the operations of 615 may be performed by a buffer 530 as described with reference to FIG. 5.

At 620, the method may include transmitting, to a host device via a metadata pin allocated for a set of memory dies including the first memory die and the second memory die, the set of metadata including the first metadata from the first memory die and the second metadata from the second memory die. The operations of 620 may be performed in accordance with examples as disclosed herein. In some examples, aspects of the operations of 620 may be performed by a transmit circuitry 535 as described with reference to FIG. 5.

In some examples, an apparatus as described herein may perform a method or methods, such as the method 600. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for receiving, at a logic component including a buffer, first data from a first memory die and second data from a second memory die; receiving, at the logic component, first metadata for the first data from the first memory die and second metadata for the second data from the second memory die; combining, at the buffer, the first metadata from the first memory die and the second metadata from the second memory die into a set of metadata; and transmitting, to a host device via a metadata pin allocated for a set of memory dies including the first memory die and the second memory die, the set of metadata including the first metadata from the first memory die and the second metadata from the second memory die.

Aspect 2: The method, apparatus, or non-transitory computer-readable medium of aspect 1, further including operations, features, circuitry, logic, means, or instructions, or any combination thereof for transmitting, to the host device over one or more data pins, the first data, the second data, or both, concurrently with transmitting the set of metadata.

Aspect 3: The method, apparatus, or non-transitory computer-readable medium of any of aspects 1 through 2, further including operations, features, circuitry, logic, means, or instructions, or any combination thereof for generating CRC bits for a set of data including the first data from the first memory die and the second data from the second memory die and transmitting, over the metadata pin, the CRC bits for the set of data including the first data from the first memory die and the second data from the second memory die.

Aspect 4: The method, apparatus, or non-transitory computer-readable medium of any of aspects 1 through 3, further including operations, features, circuitry, logic, means, or instructions, or any combination thereof for generating CRC bits for the set of metadata including the first metadata from the first memory die and the second metadata from the second memory die and transmitting, over the metadata pin, the CRC bits for the set of metadata including the first metadata from the first memory die and the second metadata from the second memory die.

Aspect 5: The method, apparatus, or non-transitory computer-readable medium of any of aspects 1 through 4, where the set of memory dies includes a third memory die and the method, apparatuses, and non-transitory computer-readable medium further includes operations, features, circuitry, logic, means, or instructions, or any combination thereof for receiving third data and third metadata for the third data from the third memory die, where the third metadata is combined into the set of metadata and transmitted over the metadata pin.

Aspect 6: The method, apparatus, or non-transitory computer-readable medium of any of aspects 1 through 5, further including operations, features, circuitry, logic, means, or instructions, or any combination thereof for receiving, over the metadata pin, third metadata for third data to be stored in the first memory die and fourth metadata for fourth data to be stored in the second memory die and transmitting the third data and the third metadata to the first memory die for storage, and the fourth data and the fourth metadata to the second memory die for storage.

Aspect 7: The method, apparatus, or non-transitory computer-readable medium of any of aspects 1 through 6, further including operations, features, circuitry, logic, means, or instructions, or any combination thereof for receiving, over the metadata pin, CRC bits for a second set of data that includes third data for storage at the first memory die and that includes for fourth data for storage at the second memory die and determining an error status for the second set of data based at least in part on the CRC bits for the second set of data.

Aspect 8: The method, apparatus, or non-transitory computer-readable medium of aspect 7, further including operations, features, circuitry, logic, means, or instructions, or any combination thereof for receiving, over the metadata pin, CRC bits for a second set of metadata that includes third metadata for the third data and that includes fourth metadata for the fourth data and determining an error status for the second set of metadata based at least in part on the CRC bits for the second set of metadata.

Aspect 9: The method, apparatus, or non-transitory computer-readable medium of any of aspects 1 through 8, further including operations, features, circuitry, logic, means, or instructions, or any combination thereof for receiving, at the logic component, a request for the first data and the second data, where the first data, the first metadata, the second data, and the second metadata are received based at least in part on the request.

It should be noted that the methods described herein describe possible implementations, and that the operations and the steps may be rearranged or otherwise modified and that other implementations are possible. Further, portions from two or more of the methods may be combined.

An apparatus is described. The following provides an overview of aspects of the apparatus as described herein:

Aspect 10: An apparatus, including: a first memory die configured to transmit first data and first metadata for the first data to a logic component; a second memory die configured to transmit second data and second metadata for the second data to the logic component; a buffer in the logic component and configured to combine the first metadata from the first memory die and the second metadata from the second memory die into a set of metadata; and a metadata pin coupled with the logic component and configured to transmit, to a host device, the set of metadata including the first metadata from the first memory die and the second metadata from the second memory die.

Aspect 11: The apparatus of aspect 10, further including: one or more data pins coupled with the logic component and configured to transmit the first data, the second data, or both, concurrently with transmission of the set of metadata over the metadata pin.

Aspect 12: The apparatus of any of aspects 10 through 11, where the logic component is configured to: generate CRC bits for a set of data including the first data from the first memory die and the second data from the second memory die; and where the metadata pin is further configured to: transmit the CRC bits for the set of data.

Aspect 13: The apparatus of aspect 12, where the logic component is further configured to: generate CRC bits for the set of metadata including the first metadata from the first memory die and the second metadata from the second memory die; and where the metadata pin is further configured to: transmit the CRC bits for the set of metadata.

Aspect 14: The apparatus of any of aspects 10 through 13, where the logic component is further configured to: receive third data and third metadata for the third data from a third memory die, and where the buffer is further configured to: combine the third metadata into the set of metadata.

Aspect 15: The apparatus of any of aspects 10 through 14, where the metadata pin is further configured to: receive third metadata for third data to be stored in the first memory die and fourth metadata for fourth data to be stored in the second memory die; and where the logic component is further configured to: transmit the third data and the third metadata to the first memory die for storage and transmit the fourth data and the fourth metadata to the second memory die for storage.

Aspect 16: The apparatus of any of aspects 10 through 15, where the metadata pin is further configured to: receive CRC bits for a second set of data that includes third data for storage at the first memory die and that includes for fourth data for storage at the second memory die; and where the logic component is further configured to: determine an error status for the second set of data based at least in part on the CRC bits for the second set of data.

Aspect 17: The apparatus of aspect 16, where the metadata pin is further configured to: receive CRC bits for a second set of metadata that includes third metadata for the third data and that includes fourth metadata for the fourth data; and where the logic component is further configured to: determine an error status for the second set of metadata based at least in part on the CRC bits for the second set of metadata.

Information and signals described herein may be represented using any of a variety of different technologies and techniques. For example, data, instructions, commands, information, signals, bits, or symbols of signaling that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (e.g., in conductive contact with, connected with, coupled with) one another if there is any electrical path (e.g., conductive path) between the components that can, at any time, support the flow of signals (e.g., charge, current, voltage) between the components. At any given time, a conductive path between components that are in electronic communication with each other (e.g., in conductive contact with, connected with, coupled with) may be an open circuit or a closed circuit based on the operation of the device that includes the connected components. A conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" (e.g., "electrically coupling") may refer to condition of moving from an open-circuit relationship between components in which signals are not presently capable of being communicated between the components (e.g., over a conductive path) to a closed-circuit relationship between components in which signals are capable of being communicated between components (e.g., over the conductive path). When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component (e.g., a transistor) discussed herein may represent a field-effect transistor (FET), and may comprise a three-terminal component including a source (e.g., a source terminal), a drain (e.g., a drain terminal), and a gate (e.g., a gate terminal). The terminals may be connected to other electronic components through conductive materials (e.g., metals, alloys). The source and drain may be conductive, and may comprise a doped (e.g., heavily-doped, degenerate) semiconductor region. The source and drain may be separated by a doped (e.g., lightly-doped) semiconductor region or channel. If the channel is n-type (e.g., majority carriers are electrons), then the FET may be referred to as a n-type FET. If the channel is p-type (e.g., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over as one or more instructions (e.g., code) on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with a processor, such as a DSP, an ASIC, an FPGA, discrete gate logic, discrete transistor logic, discrete hardware components, other programmable logic device, or any combination thereof designed to perform the functions described herein. A processor may be an example of a microprocessor, a controller, a microcontroller, a state machine, or any type of processor. A processor may also be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a computer, or a processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:
1. A method, comprising:
receiving, at a logic component comprising a buffer, first data from a first memory die and second data from a second memory die;

receiving, at the logic component, first metadata for the first data from the first memory die and second metadata for the second data from the second memory die;
combining, at the buffer, the first metadata from the first memory die and the second metadata from the second memory die into a set of metadata;
generating cyclic redundancy check (CRC) bits for the set of metadata comprising the first metadata from the first memory die and the second metadata from the second memory die;
transmitting, to a host device via a metadata pin allocated for a set of memory dies comprising the first memory die and the second memory die, the set of metadata comprising the first metadata from the first memory die and the second metadata from the second memory die; and
transmitting, over the metadata pin, the CRC bits for the set of metadata comprising the first metadata from the first memory die and the second metadata from the second memory die.

2. The method of claim 1, further comprising:
transmitting, to the host device over one or more data pins, the first data, the second data, or both, concurrently with transmitting the set of metadata.

3. The method of claim 1, further comprising:
generating second CRC bits for a set of data comprising the first data from the first memory die and the second data from the second memory die; and
transmitting, over the metadata pin, the second CRC bits for the set of data comprising the first data from the first memory die and the second data from the second memory die.

4. The method of claim 1, wherein the set of memory dies comprises a third memory die, the method further comprising:
receiving third data and third metadata for the third data from the third memory die, wherein the third metadata is combined into the set of metadata and transmitted over the metadata pin.

5. The method of claim 1, further comprising:
receiving, over the metadata pin, third metadata for third data to be stored in the first memory die and fourth metadata for fourth data to be stored in the second memory die; and
transmitting the third data and the third metadata to the first memory die for storage, and the fourth data and the fourth metadata to the second memory die for storage.

6. The method of claim 1, further comprising:
receiving, over the metadata pin, second CRC bits for a second set of data that comprises third data for storage at the first memory die and that comprises for fourth data for storage at the second memory die; and
determining an error status for the second set of data based at least in part on the second CRC bits for the second set of data.

7. The method of claim 6, further comprising:
receiving, over the metadata pin, third CRC bits for a second set of metadata that comprises third metadata for the third data and that comprises fourth metadata for the fourth data; and
determining an error status for the second set of metadata based at least in part on the third CRC bits for the second set of metadata.

8. The method of claim 1, further comprising:
receiving, at the logic component, a request for the first data and the second data, wherein the first data, the first metadata, the second data, and the second metadata are received based at least in part on the request.

9. An apparatus, comprising:
a first memory die configured to transmit first data and first metadata for the first data to a logic component;
a second memory die configured to transmit second data and second metadata for the second data to the logic component;
a buffer in the logic component and configured to combine the first metadata from the first memory die and the second metadata from the second memory die into a set of metadata, wherein the logic component is further configured to generate cyclic redundancy check (CRC) bits for the set of metadata comprising the first metadata from the first memory die and the second metadata from the second memory die; and
a metadata pin coupled with the logic component and configured to transmit, to a host device, the set of metadata comprising the first metadata from the first memory die and the second metadata from the second memory die, wherein the metadata pin is further configured to transmit the CRC bits for the set of metadata.

10. The apparatus of claim 9, further comprising:
one or more data pins coupled with the logic component and configured to transmit the first data, the second data, or both, concurrently with transmission of the set of metadata over the metadata pin.

11. The apparatus of claim 9, wherein the logic component is configured to:
generate second CRC bits for a set of data comprising the first data from the first memory die and the second data from the second memory die; and wherein the metadata pin is further configured to:
transmit the second CRC bits for the set of data.

12. The apparatus of claim 9, wherein the logic component is further configured to:
receive third data and third metadata for the third data from a third memory die, and wherein the buffer is further configured to:
combine the third metadata into the set of metadata.

13. The apparatus of claim 9, wherein the metadata pin is further configured to:
receive third metadata for third data to be stored in the first memory die and fourth metadata for fourth data to be stored in the second memory die; and wherein the logic component is further configured to:
transmit the third data and the third metadata to the first memory die for storage and transmit the fourth data and the fourth metadata to the second memory die for storage.

14. The apparatus of claim 9, wherein the metadata pin is further configured to:
receive second CRC bits for a second set of data that comprises third data for storage at the first memory die and that comprises for fourth data for storage at the second memory die; and wherein the logic component is further configured to:
determine an error status for the second set of data based at least in part on the second CRC bits for the second set of data.

15. The apparatus of claim 14, wherein the metadata pin is further configured to:
receive third CRC bits for a second set of metadata that comprises third metadata for the third data and that comprises fourth metadata for the fourth data; and wherein the logic component is further configured to:

determine an error status for the second set of metadata based at least in part on the third CRC bits for the second set of metadata.

16. An apparatus, comprising:
a memory device; and
one or more controllers coupled with the memory device and configured to cause the memory device to:
  receive, at the one or more controllers, first data from a first memory die of the memory device and second data from a second memory die of the memory device;
  receive, at the one or more controllers, first metadata for the first data from the first memory die and second metadata for the second data from the second memory die;
  combine, at a buffer, the first metadata from the first memory die and the second metadata from the second memory die into a set of metadata;
  generate cyclic redundancy check (CRC) bits for the set of metadata comprising the first metadata from the first memory die and the second metadata from the second memory die;
  transmit, to a host device via a metadata pin allocated for a set of memory dies comprising the first memory die and the second memory die, the set of metadata comprising the first metadata from the first memory die and the second metadata from the second memory die; and
  transmit, over the metadata pin, the CRC bits for the set of metadata comprising the first metadata from the first memory die and the second metadata from the second memory die.

17. The apparatus of claim 16, wherein the one or more controllers are further configured to cause the apparatus to:
  transmit, to the host device over one or more data pins, the first data, the second data, or both, concurrently with transmitting the set of metadata.

18. The apparatus of claim 16, wherein the one or more controllers are further configured to cause the apparatus to:
  generate second CRC bits for a set of data comprising the first data from the first memory die and the second data from the second memory die; and
  transmit, over the metadata pin, the second CRC bits for the set of data comprising the first data from the first memory die and the second data from the second memory die.

* * * * *